United States Patent Office

3,316,225
Patented Apr. 25, 1967

3,316,225
1-DIALLYLAMINO-2,3-EPOXYPROPANE AND ITS COPOLYMERS WITH STYRENE
Francis W. Michelotti, Brooklyn, N.Y., assignor to Interchemical Corporation, New York, N.Y., a corporation of Ohio
No Drawing. Filed Sept. 15, 1961, Ser. No. 139,331
2 Claims. (Cl. 260—88.1)

This invention relates to 1-diallylamino-2,3-epoxypropane and to its copolymers with styrene.

The synthesis was carried out by reacting approximately equimolecular parts of epichlorohydrin and diallylamine in the presence of a little water and then treating the reaction mass with sodium hydroxide solution. Polymerization of 1-diallylamino-2,3-epoxypropane in bulk or solution (benzene) at 60° C. for 20 hours with azobisisobutyronitrile as initiator yielded no insoluble solid polymer by pouring the respective liquids into aqueous methanol. A yellow oil was obtained but was not characterized further. Copolymerization of 1-diallylamino-2,3-epoxypropane at 10.7 mole percent with styrene under similar conditions resulted in the isolation of essentially pure polystyrene, while at 48.2 mole percent a copolymer was obtained containing 5.57 mole percent of the epoxy monomer. After 8 hours of polymerization conversions were of the order of 26% and 16%, respectively. It appears therefore that this monomer, being a diallylic system, is as sluggish as other allylic monomers in homo- and copolymerization behavior.

1-diallylamino-2,3-epoxypropane may be copolymerized with acrylic and methacrylic acids and their esters with vinyl monomers, etc. Its copolymers with styrene or other monomers may be used in resistant surface coatings for finishing wood, can linings, paper coatings, and the like.

*Example 1.—1-diallylamino-2,3-epoxypropane (I)*

A solution of 230 g. (2.37 moles) of diallylamine, 222.4 g. (2.41 moles) of epichlorohydrin and 7.2 g. of water was stirred for about 7 hours maintaining the temperature at approximately 29° C. with external cooling. Then 112 g. (2.8 moles) of sodium hydroxide in 182.4 ml. of water were added at a rate sufficient to keep the temperature at about 22° C. Stirring was continued for another two hours, followed by pouring of the reaction mixture into 400 ml. of water. The aqueous layer after separation from the organic layer was washed three times with 40 ml. of ether. The ether washings were then combined and added to the organic layer, which was then dried over anhydrous potassium carbonate. In some instances it was found necessary to give the product a second treatment with base to insure complete dehydrochlorination. The liquid was filtered, the ether stripped, and the residue fractionated. The material boiling at 55–56° C. at 4 mm. of mercury was collected and amounted to 227 g. or a yield of 50.4%. Its refractive index was $n_D^{29}=1.4579$.

Theoretical for $C_9H_{15}NO$.—C, 70.54; H, 9.87; N, 9.14.
Found by analysis—C, 70.21; H, 10.10; N, 9.11.

The reaction may be represented as follows:

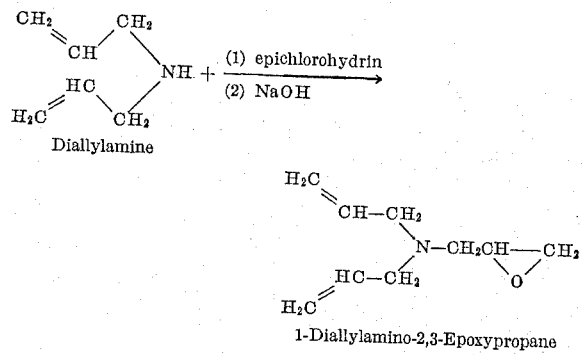

The infrared spectrum of the product shows strong absorption at 6.10, 10.08, and 10.90μ, indicative of the vinyl grouping; peaks at 7.95, 11.80, and 12.08μ are consistent with oxirane oxygen; finally, the absence of any N—H stretching in the 2.9–3.4μ region is in accord with the presence of a tertiary amine. That no electronic rearrangement to an enamine in the dehydrochlorination step with base takes place is indicated by its ultraviolet transparency in the 228–238 mu region, a range characteristic of enamine absorption. J. Am. Chem. Soc. 77 437 (1955) is the authority for this conclusion.

*Example 2.—Copolymerization with styrene*

(a) 50 ml. of thiophene-free benzene, 42.5 g. of styrene, 7.5 g. (10.7 mole percent) of 1-diallylamino-2,3-epoxypropane, and 0.5 g. of azobisisobutyronitrile were stirred together 8 hours at 60° C. under a blanket of nitrogen. After the first 4 hours, 0.5 g. more of azobisisobutyronitrile was added and at the end of the 8-hour period of heating, the solution was poured into methanol. The white solid thus precipitated was redissolved in benzene and reprecipitated in methanol until a total of 3 precipitations had been made. 13 g. (26% conversion) of polymer were obtained. Analysis showed it to be styrene.

Calculated for $C_8H_8$: C, 92.26; H, 7.74. Found: C, 92.66; H, 7.67; N trace.

(b) The process was repeated, but using 48.2 mole percent of 1-diallylamino-2,3-epoxypropane instead of 10.7 mole percent. 8.0 g. (16% conversion of polymer were obtained.

Analysis showed: C, 91.09; H, 8.01; N, 0.51, corresponding to 5.57 mole percent of the 1-diallylamino-2,3-epoxypropane in the copolymer.

What is claimed is:
1. A copolymer of 1-diallylamino-2,3-epoxypropane with styrene.
2. A copolymer of a major amount of styrene and a minor amount of 1-diallylamino-2,3-epoxypropane.

(References on following page)

References Cited by the Examiner

UNITED STATES PATENTS

| | | | |
|---|---|---|---|
| 2,831,837 | 4/1958 | Evans et al. | 260—88.1 |
| 2,983,703 | 5/1961 | D'Alelio | 260—348 |
| 2,996,504 | 8/1961 | Zimmerman et al. | 260—348 |
| 3,032,539 | 5/1962 | Schuller et al. | 260—88.1 XR |
| 3,057,833 | 10/1962 | Devlin | 260—88.1 |

JOSEPH L. SCHOFER, *Primary Examiner.*

N. G. TORCHIN, M. B. KURTZMAN, *Assistant Examiners.*